(12) United States Patent
Tagawa et al.

(10) Patent No.: US 10,215,549 B2
(45) Date of Patent: Feb. 26, 2019

(54) METHOD FOR MEASURING DEFLECTION AMOUNT OF COLUMNAR STRUCTURE AND METHOD FOR DETERMINING PERFORMANCE OF COLUMNAR STRUCTURE

(71) Applicant: Tokyo Electric Power Company Holdings, Incorporated, Tokyo (JP)

(72) Inventors: Yuuji Tagawa, Tokyo (JP); Kazunari Kashima, Tokyo (JP); Chikara Morooka, Tokyo (JP); Hideharu Oniki, Tokyo (JP); Yuya Niidome, Tokyo (JP); Makoto Koide, Tokyo (JP); Teppei Kishida, Tokyo (JP); Takeya Nakajima, Tokyo (JP); Hiroyuki Abe, Tokyo (JP); Hideharu Osoguchi, Tokyo (JP)

(73) Assignee: Tokyo Electric Power Company Holdings, Incorporated, Tokyo (JP)

( * ) Notice: Subject to any disclaimer, the term of this patent is extended or adjusted under 35 U.S.C. 154(b) by 154 days.

(21) Appl. No.: 15/459,506

(22) Filed: Mar. 15, 2017

(65) Prior Publication Data
US 2017/0184386 A1 Jun. 29, 2017

Related U.S. Application Data

(63) Continuation-in-part of application No. PCT/JP2015/058499, filed on Mar. 20, 2015.

(51) Int. Cl.
*G01B 5/20* (2006.01)
*G01M 99/00* (2011.01)
(Continued)

(52) U.S. Cl.
CPC .............. *G01B 5/20* (2013.01); *G01B 5/14* (2013.01); *G01B 5/30* (2013.01); *G01M 99/00* (2013.01); *G01B 3/02* (2013.01)

(58) Field of Classification Search
CPC ...................................................... G01B 5/20
(Continued)

(56) References Cited

U.S. PATENT DOCUMENTS 5,339,534 A * 8/1994 Krayenhagen ......... G01B 5/285
33/533
5,519,944 A * 5/1996 Delastre ................ G01B 7/345
33/1 Q
(Continued)

FOREIGN PATENT DOCUMENTS

JP S61-182514 A 8/1986
JP S63-118503 U 8/1988
(Continued)

OTHER PUBLICATIONS

Notice of Allowance with English Language Translation dated Jun. 13, 2017, issued in JP patent application No. 2016-550888 (6 pages).
International Search Report dated Jun. 2, 2015 for PCT/JP2015/058499.

*Primary Examiner* — G. Bradley Bennett
(74) *Attorney, Agent, or Firm* — Drinker Biddle & Reath LLP

(57) ABSTRACT

A method for measuring a deflection amount of a columnar structure includes the following steps. The method includes placing a longitudinal direction of a columnar structure in a direction parallel to a ground to place the columnar structure on a support member that supports the columnar structure such that the columnar structure is rotatable around an axis in the longitudinal direction; determining that the columnar structure placed has stopped rotating under its own weight
(Continued)

around the axis; and measuring, after the stop of the rotation is determined, measuring a distance in a vertical direction between a straight line connecting both ends in the longitudinal direction of the columnar structure and a curved line along a shape in the longitudinal direction of the columnar structure.

4 Claims, 8 Drawing Sheets

(51) Int. Cl.
*G01B 5/14* (2006.01)
*G01B 5/30* (2006.01)
*G01B 3/02* (2006.01)

(58) Field of Classification Search
USPC .......................................... 33/533, 551, 701
See application file for complete search history.

(56) References Cited

U.S. PATENT DOCUMENTS

| | | | |
|---|---|---|---|
| 6,782,631 B1* | 8/2004 | Face, III | G01C 7/04 |
| | | | 33/501.02 |
| 7,748,134 B1 | 7/2010 | Wang | |
| 8,079,154 B1* | 12/2011 | Finlayson | G01B 5/24 |
| | | | 33/303 |
| 8,898,916 B2* | 12/2014 | Heyer | G01C 25/00 |
| | | | 33/374 |
| 9,329,018 B1* | 5/2016 | Smith | G01B 5/285 |
| 2002/0007562 A1* | 1/2002 | Kumazawa | G01B 21/20 |
| | | | 33/533 |
| 2017/0167860 A1* | 6/2017 | Oota | G01B 11/24 |
| 2017/0191817 A1* | 7/2017 | Layton, Jr. | G01B 5/28 |

FOREIGN PATENT DOCUMENTS

| | | |
|---|---|---|
| JP | S63-246606 A | 10/1988 |
| JP | H06-94442 A | 4/1994 |
| JP | 2008-96160 A | 4/2008 |

\* cited by examiner

METHOD FOR MEASURING DEFLECTION AMOUNT OF COLUMNAR STRUCTURE AND METHOD FOR DETERMINING PERFORMANCE OF COLUMNAR STRUCTURE

BACKGROUND

Technical Fields

Embodiments of the present invention generally relate to a method for measuring a deflection amount of a columnar structure and a method for determining performance of the columnar structure.

Background Art

RELATED ART

In related art, a technique for measuring a deflection amount of a support (i.e. utility pole) that holds electric wires from a power distribution facility or the like that supplies power has been proposed, disclosed in Japanese Unexamined Patent Application, First Publication No. 6-94442.

However, since a technique described in Patent Literature 1 requires an imaging apparatus and an arithmetic device for measurement, there has been a problem of complicated work. Specifically, the technique described in Patent Literature 1 has had a problem that time and effort for work cannot be reduced due to a complex configuration of a measuring device. The present invention has been made in consideration of the above-mentioned circumstances, and provides a method for measuring a deflection amount of a columnar structure and a method for determining performance of the columnar structure by which time and effort for work for measuring the deflection amount of the columnar structure and work for determining the performance of the columnar structure can be reduced.

SUMMARY

In embodiments, a method for measuring a deflection amount of a columnar structure may include, but is not limited to, placing a longitudinal direction of a columnar structure in a direction parallel to a ground to place the columnar structure on a rolling surface of a support member, the rolling surface being parallel to the ground and configured to support the columnar structure such that the columnar structure is rotatable around an axis in the longitudinal direction; waiting for a relative position between a position on the rolling surface where the columnar structure has been placed and a position of the columnar structure to change when the columnar structure placed on the rolling surface rotates under its own weight of the columnar structure around the axis of the columnar structure; determining that the columnar structure has stopped rotating under its own weight around the axis; and measuring, after the stop of the rotation is determined, a distance in a vertical direction between a straight line connecting both ends in the longitudinal direction of the columnar structure and a curved line along a shape in the longitudinal direction of the columnar structure.

Further features and aspects of the present disclosure will become apparent from the following detailed description of exemplary embodiments with reference to the attached drawings.

DETAILED DESCRIPTION OF THE EMBODIMENTS

Figure 1:
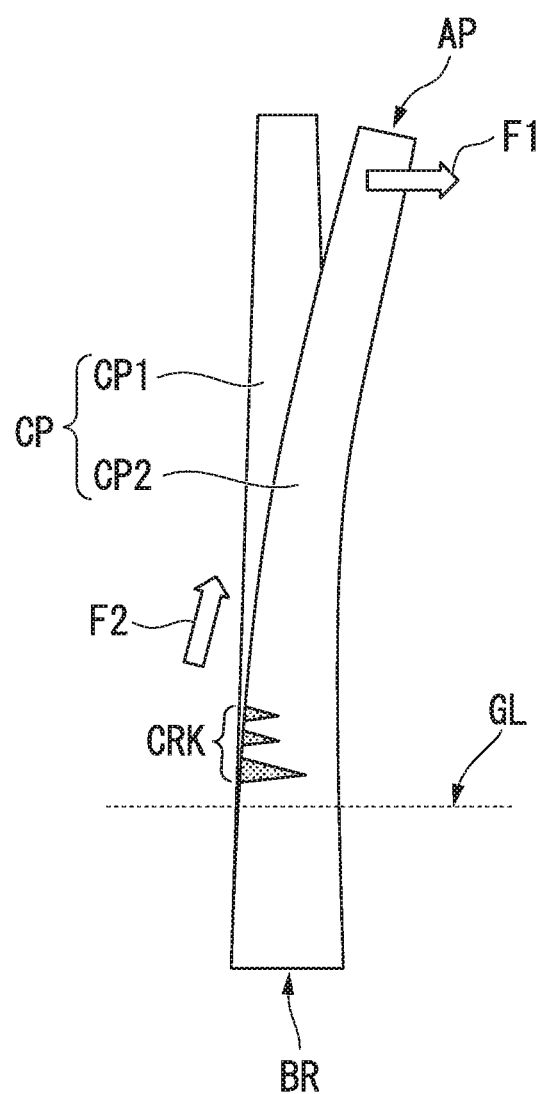
FIG. 1 is a schematic view representing an exemplary state of a columnar structure according to the present embodiment.

In embodiments, a method for measuring a deflection amount of a columnar structure may include, but is not limited to, placing a longitudinal direction of a columnar structure in a direction parallel to a ground to place the columnar structure on a rolling surface of a support member, the rolling surface being parallel to the ground and configured to support the columnar structure such that the columnar structure is rotatable around an axis in the longitudinal direction; waiting for a relative position between a position on the rolling surface where the columnar structure has been placed and a position of the columnar structure to change when the columnar structure placed on the rolling surface rotates under its own weight of the columnar structure around the axis of the columnar structure; determining that the columnar structure has stopped rotating under its own weight around the axis; and measuring, after the stop of the rotation is determined, a distance in a vertical direction between a straight line connecting both ends in the longitudinal direction of the columnar structure and a curved line along a shape in the longitudinal direction of the columnar structure.

In some cases, the support member is greater in hardness than the columnar structure.

In some cases, the straight line is defined to be a straight line connecting a vertical upper edge of one end of the both ends to a vertical upper edge of the other end. The curved line is defined to be a curved line along a shape in the longitudinal direction of the columnar structure from the vertical upper edge of the one end to the vertical upper edge of the other end.

In other embodiments, a method for determining performance of a columnar structure may include, but is not limited to, comparing a deflection amount of a comparative columnar structure measured in advance with a deflection amount of a measured columnar structure measured by a method for measuring a deflection amount of a columnar structure; and determining performance of the measured columnar structure. The method may include, but is not limited to, placing a longitudinal direction of each of the comparative columnar structure and the measured columnar structure in a direction parallel to a ground to place each of the comparative columnar structure and the measured columnar structure on a rolling surface of a support member, the rolling surface being parallel to the ground and configured to support each of the comparative columnar structure and the measured columnar structure such that each of the comparative columnar structure and the measured columnar structure is rotatable around an axis in the longitudinal direction; waiting for a relative position between a position on the rolling surface where each of the comparative columnar structure and the measured columnar structure has been placed and a position of each of the comparative columnar structure and the measured columnar structure to change when each of the comparative columnar structure and the measured columnar structure placed on the rolling surface rotates under its own weight of each of the comparative columnar structure and the measured columnar structure around the axis of each of the comparative columnar structure and the measured columnar structure; determining that each of the comparative columnar structure and the measured columnar structure has stopped rotating under its own weight around the axis; and measuring, after the stop of the rotation is determined, a distance in a vertical direction between a straight line connecting both ends in the longitudinal direction of each of the comparative columnar structure and the measured columnar structure and a curved line along a shape in the longitudinal direction of each of the comparative columnar structure and the measured columnar structure.

Hereinafter, an embodiment of a method for measuring a deflection amount of a columnar structure and a method for determining performance of the columnar structure according to the present invention will be described with reference to the drawings.

FIG. 1 is a schematic view representing an exemplary state of the columnar structure according to the present embodiment. In the description of the present embodiment, a utility pole made of prestressed concrete is employed as an example of the columnar structure. Hereinafter, the utility pole made of prestressed concrete will be simply described as a concrete pole CP. However, the columnar structure to be measured by the measuring method of the present embodiment is not limited to the concrete pole CP. The columnar structure of the present embodiment may be, for example, a pole made of wood or a pole made of metal. The columnar structure of the present embodiment is also not limited to an object having a function of a pole, and may be an object having any function as long as a dimension in a longitudinal direction is greater than a dimension in a radial direction.

The concrete pole CP has a cylindrical shape, a portion of which is embedded in the ground. The concrete pole CP stands by itself in a vertical direction and holds an overhead electric wire. In this case, force F1 caused by a weight of the overhead electric wire itself as well as a wind pressure load and holding tension on the overhead electric wire is applied to the concrete pole CP. When the force F1 is applied to the concrete pole CP, the concrete pole CP curves from a position of a concrete pole CP1 to a position of a concrete pole CP2 as illustrated in FIG. 1. Due to this curve, tensile force F2 is generated in the concrete pole CP1. If time passes while the force is applied in this way, a crack CRK might be generated in the concrete pole CP. In many cases, the crack CRK is generated in a part (ground edge) of the concrete pole CP near a ground surface GL. When the crack CRK is generated in the concrete pole CP, the concrete pole CP gets easily broken by an electrolyte such as rainwater that flows into the inside of the concrete pole CP.

Meanwhile, attention has been paid to a technique for reusing the concrete pole CP. The concrete pole CP might be removed from a place of installation due to a change in a power distribution route after the installation of the concrete pole CP. By reusing the removed concrete pole CP, resources can be effectively utilized and material costs can be reduced. If the crack CRK exceeding a certain amount is generated in the concrete pole CP, however, breakage might occur when such a concrete pole CP is reused. Accordingly, there is a need for a technique to determine whether the removed concrete pole CP has predetermined performance, that is, whether the concrete pole CP is reusable.

In the present embodiment, it is determined whether the concrete pole CP has the predetermined performance by focusing on a relation between the generation and degree of growth of the crack CRK in the concrete pole CP and the curving (deflection) amount of the concrete pole CP. Specifically, it is determined whether the concrete pole CP has the predetermined performance by measuring the curving (deflection) amount of the concrete pole CP. Hereinafter, the method for measuring the deflection amount of the columnar structure and the method for determining the performance of the columnar structure according to the present embodiment will be described with reference to FIGS. 2 to 7.

In the following description, an apex in the vertical direction in a case where the concrete pole CP is installed on the ground is described as an apex AP of the concrete pole CP or simply as the apex AP. In the following description, a bottom in the vertical direction in a case where the concrete pole CP is installed on the ground is described as a bottom BR of the concrete pole CP or simply as the bottom BR.

Figure 2:
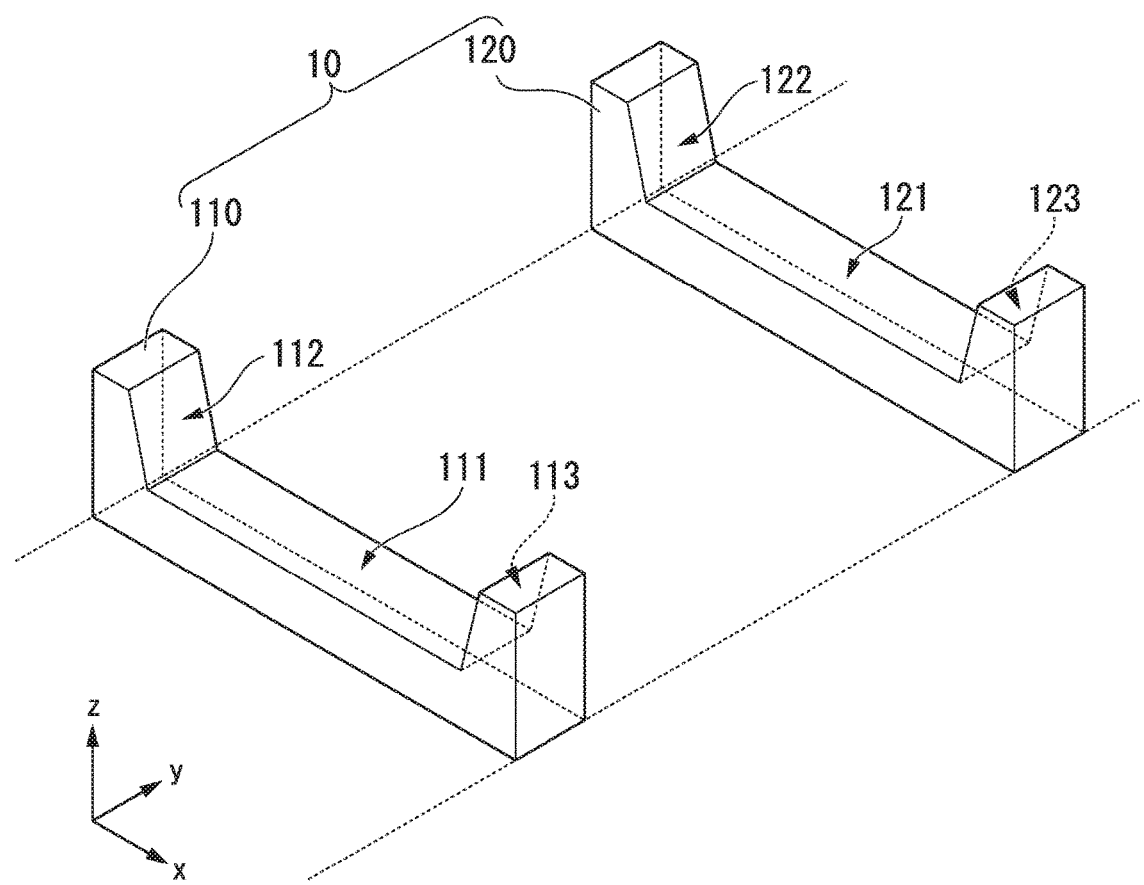
FIG. 2 is a schematic view representing an exemplary support member according to the present embodiment.

FIG. 2 is a schematic view representing an exemplary support member 10 according to the present embodiment. Hereinafter, an xyz three-dimensional orthogonal coordinate system is appropriately referred to for the description. The z axis of the xyz three-dimensional orthogonal coordinate system represents the vertical direction. The y axis represents the longitudinal direction (or length direction) of the concrete pole CP in a case where the concrete pole CP is placed in parallel to the ground. The x axis represents the radial direction (or rolling direction) of the concrete pole CP in a case where the concrete pole CP is placed in parallel to the ground.

The support member 10 includes a bottom support member 110 and an apex support member 120. The bottom support member 110 includes a rolling surface 111, a rolling stopper 112, and a rolling stopper 113. The apex support member 120 includes a rolling surface 121, a rolling stopper 122, and a rolling stopper 123. The concrete pole CP is placed on the rolling surfaces 111, 121. When the concrete pole CP is placed on the rolling surfaces 111, 121, the concrete pole CP rotates under its own weight to roll in the x axis direction. Each of the rolling stoppers 112, 113, 122, 123 prevents the concrete pole CP from falling off the rolling surfaces 111, 121. The support member 10 may not include any or all of the rolling stoppers 112, 113, 122, 123. The support member 10 is preferably placed such that the rolling surfaces 111, 121 are set horizontally.

The support member 10 preferably has a low rolling resistance coefficient in a case where the concrete pole CP is placed. Specifically, the support member 10 is preferably configured such that the surfaces of the rolling surfaces 111, 121 are smooth. The support member 10 is preferably configured such that the surfaces of the rolling surfaces 111, 121 are less deformed or not deformed at all in a case where the concrete pole CP is placed. In other words, the support member 10 is preferably configured such that the rolling surfaces 111, 121 each have a hardness greater than a hardness of the concrete pole CP. More specifically, the support member 10 is preferably configured such that the rolling surfaces 111, 121 are made of metal such as iron.

This example is described, without limitation, under the presumption that the support member 10 is fixed and installed on the ground. The support member 10 may be portable. In this case, the support member 10 may include a level gauge that measures whether an installation state of the support member 10 is a horizontal state and an adjustment leg (e.g. adjuster) that adjusts the installation state of the support member 10 to the horizontal state.

Next, the method for measuring the deflection amount of the columnar structure and the method for determining the performance of the columnar structure according to the present embodiment will be described with reference to FIG. 3.

Figure 3:
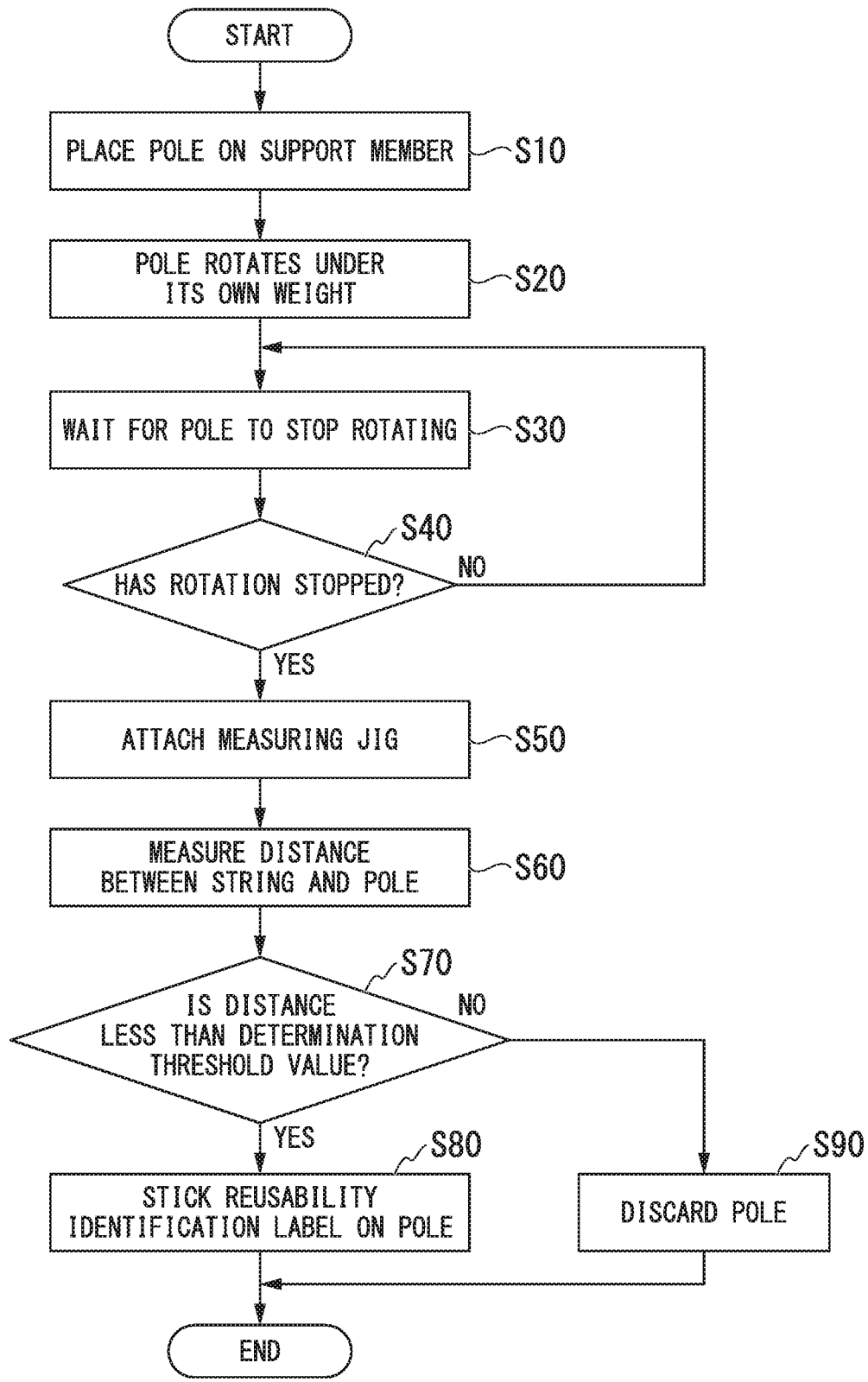
FIG. 3 is a flowchart representing an exemplary procedure for measuring a deflection amount of the columnar structure and determining performance of the columnar structure according to the present embodiment.

FIG. 3 is a flowchart representing an exemplary procedure for measuring the deflection amount of the columnar structure and determining the performance of the columnar structure according to the present embodiment.

The concrete pole CP is placed on the support member 10 (step S10). More specifically, the concrete pole is placed on the rolling surfaces 111, 121 of the support member 10 with the longitudinal direction set in a direction parallel to the ground, that is, with the longitudinal direction directed in the y axis direction.

The concrete pole CP rotates under its own weight around an axis in the longitudinal direction, namely the x axis (step S20). At this time, the concrete pole CP is rotatably supported by the rolling surfaces 111, 121. In a case where the curve (deflection) occurs in the concrete pole CP, the concrete pole CP rotates such that a deflection direction coincides with a gravity direction. The next step waits for the concrete pole CP to stop rotating (step S30). However, step S30 not only waits for the concrete pole CP to stop rotating but also may promote the rotation such that the deflection direction of the concrete pole CP coincides with the gravity direction.

Next, it is determined whether the rotation of the concrete pole CP has stopped (step S40). When it is determined that the rotation of the concrete pole CP has stopped (step S40; YES), the procedure proceeds to step S50. On the other hand, when it is determined that the rotation of the concrete pole CP has not stopped (step S40; NO), the procedure returns to step S30.

Next, a measuring jig 20 is attached to the concrete pole CP (step S50). An example of the attachment of the measuring jig 20 to the concrete pole CP will be described with reference to FIG. 4.

Figure 4:
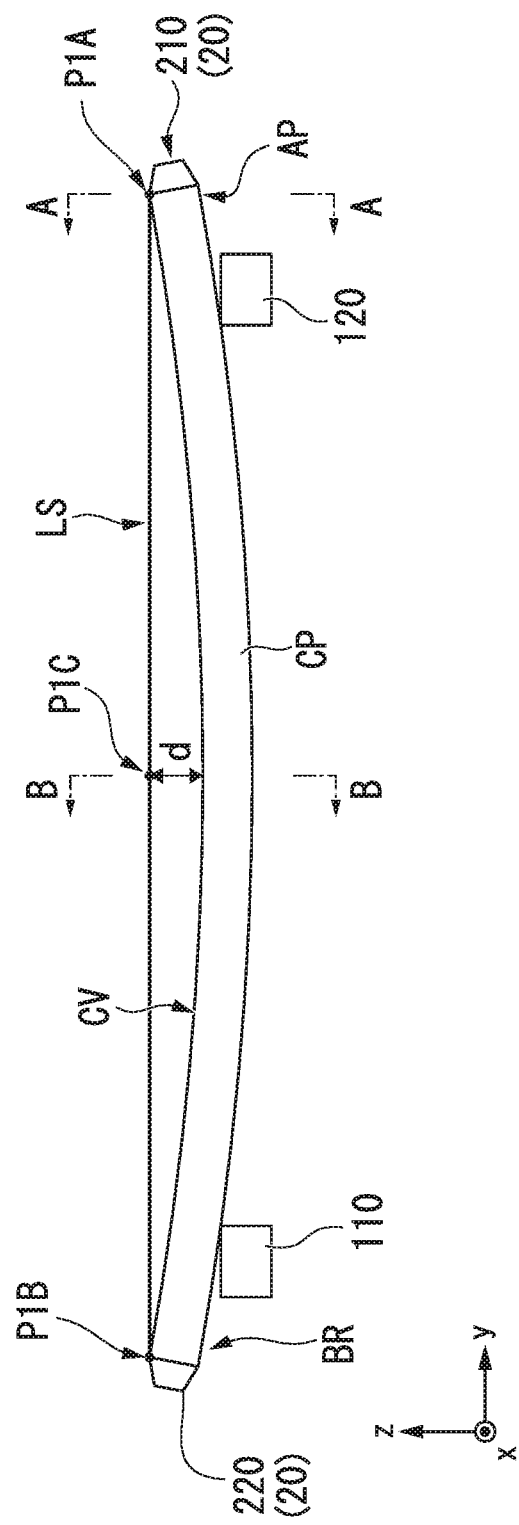
FIG. 4 is a schematic view representing an exemplary state of measuring a deflection amount of a concrete pole according to the present embodiment.

FIG. 4 is a schematic view representing an exemplary state of measuring the deflection amount of the concrete pole CP according to the present embodiment. As illustrated in FIG. 4, when the concrete pole CP is placed on the support members 110, 120, the concrete pole CP rotates such that the deflection direction coincides with the gravity direction, and then stops. In the example illustrated in FIG. 4, a deflection represented by a curved line CV occurs in the concrete pole CP. Specifically, in this example, the curved line CV indicates a shape in the longitudinal direction of the concrete pole CP. The measuring jig 20 includes an apex jig 210, a bottom jig 220, and a string LS. The apex jig 210 and the bottom jig 220 are coupled to each other by the string LS. The string LS is a thread selected based on, for example, water resistance, strength, a property of being hardly tangled, and a cost. The apex jig 210 is attached to the apex AP of the concrete pole CP. This apex jig 210 has a cup shape and is attached so as to cover the apex AP. Owing to the feature that the apex jig 210 has the cup shape, the apex jig 210 never naturally falls off the apex AP while the apex jig 210 is attached to the apex AP. In other words, the apex jig 210 does not naturally fall off the apex AP while the apex jig 210 is attached to the apex AP even if a measuring worker releases his/her hand from the apex jig 210. Therefore, the measuring worker can perform an operation for attaching the bottom jig 220 by himself/herself after attaching the apex jig 210.

The bottom jig 220 is attached to the bottom BR of the concrete pole CP. When tension is applied to the string LS while the apex jig 210 and the bottom jig 220 are attached to the concrete pole CP, a straight line of the string LS is generated between a certain point P1A on the apex AP and a certain point P1B on the bottom BR. The point P1A as used herein is a vertical upper edge of the apex AP. The point P1B is a vertical upper edge of the bottom BR. An exemplary mechanism for applying the tension to the string LS will be described with reference to FIG. 5.

Figure 5:
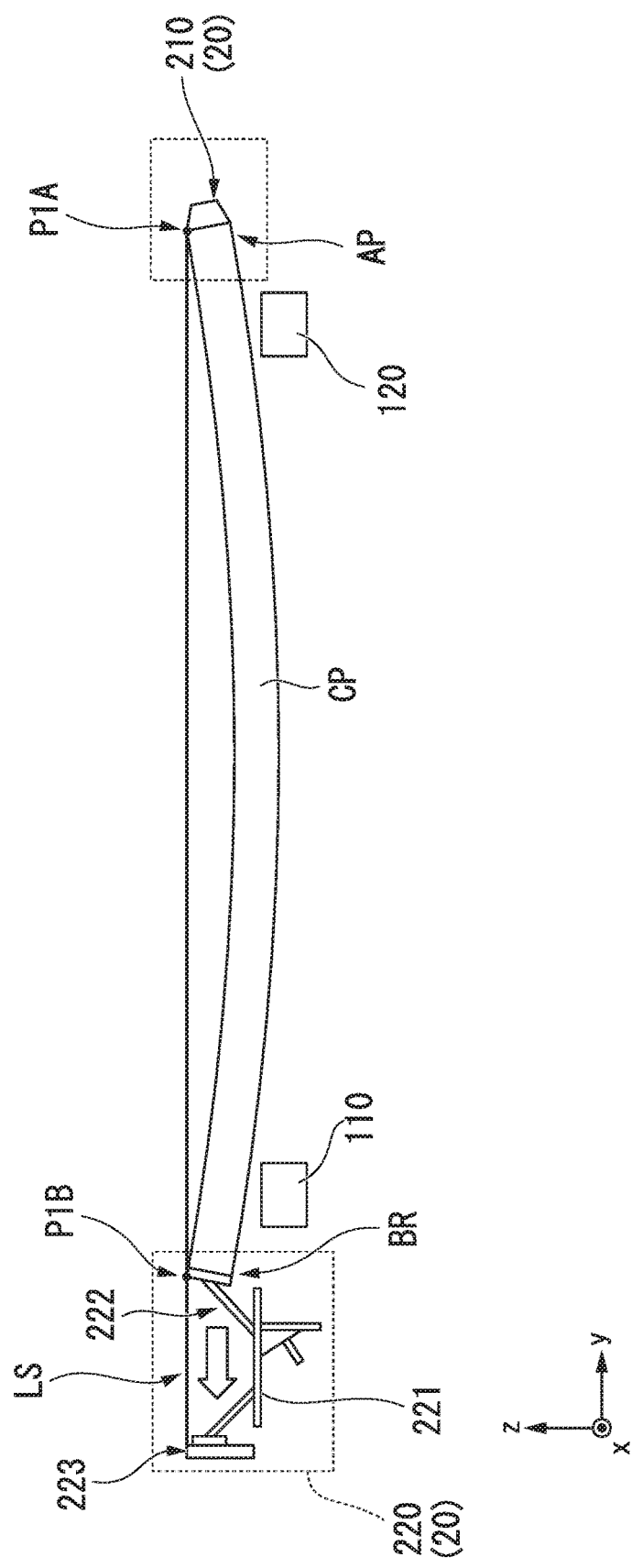
FIG. 5 is a schematic view representing an exemplary configuration of a measuring jig according to the present embodiment.

FIG. 5 is a schematic view representing an exemplary configuration of the measuring jig 20 according to the present embodiment. The bottom jig 220 includes a wire tensioner 221. The wire tensioner 221 includes a fixed part 222 and a movable part 223. The fixed part 222 is attached to the bottom BR of the concrete pole CP. The movable part 223 moves along the y axis in a direction opposite to the apex AP while holding one end of the string LS. As a result, the tension along the y axis in the direction opposite to the apex AP is applied to the string LS.

Owing to the feature that the bottom jig 220 applies the tension along the y axis in the direction opposite to the apex AP, the bottom jig 220 never naturally falls off the bottom BR while the bottom jig 220 is attached to the bottom BR. In other words, the bottom jig 220 does not naturally fall off the bottom BR while the bottom jig 220 is attached to the bottom BR even if the measuring worker releases his/her hand from the bottom jig 220. Therefore, the measuring worker can perform an operation for measuring the deflection amount by himself/herself after attaching the bottom jig 220.

Returning to FIG. 3, a distance between the string LS and the concrete pole CP is measured (step S60). This distance is a distance d illustrated in FIG. 4. The distance d is a distance in the vertical direction between the string LS, namely the straight line connecting both ends in the longitudinal direction of the concrete pole CP, and the curved line CV along the shape in the longitudinal direction of the concrete pole CP. The distance d can be measured by applying a ruler (scale) to a point PIC on the string LS illustrated in FIG. 4 vertically toward the concrete pole CP. As mentioned above, since the measuring jig 20 never naturally falls off the concrete pole CP once the measuring jig 20 is attached to the concrete pole CP, the measuring worker can perform the operation for measuring the distance d by himself/herself.

Next, it is determined whether the measured distance d is less than a determination threshold value (step S70). The determination threshold value as used herein is defined in advance based on data about a concrete pole of the same kind as the measured concrete pole CP. The determination threshold value may be updated when data about a comparative concrete pole indicating a relationship between the deflection amount and the generation and degree of growth of the crack are updated. The relationship between the deflection amount of the concrete pole CP and the generation and degree of growth of the crack in the concrete pole CP is determined in accordance with a reinforcing bar material and a construction method or the like, and similar tendencies can be obtained for the concrete poles CP having the same conditions.

When it is determined that the measured distance d is less than the determination threshold value (step S70; YES), the procedure proceeds to step S80. When it is determined that the measured distance d is equal to or greater than the determination threshold value (step S70; NO), the procedure proceeds to step S90.

In step S80, an identification label indicating reusability is stuck on the measured concrete pole CP, and a series of work is ended.

In step S90, the measured concrete pole CP is regarded as not reusable and discarded.

As mentioned above, the method for measuring the deflection amount of the columnar structure according to the present embodiment measures the deflection amount using the support member 10 that enables the columnar structure to rotate under its own weight. Therefore, according to the measuring method of the present embodiment, the deflection direction of the concrete pole CP to be measured is naturally turned to the same direction at every time of measurement. Thus, according to the measuring method of the present embodiment, since it is not necessary to determine the deflection direction of the concrete pole CP to be measured at every time of measurement, the procedure is simplified. In other words, according to the method of the present embodiment, time and effort for work for measuring the deflection amount of the columnar structure and work for determining the performance of the columnar structure can be reduced.

In addition, the method for measuring the deflection amount of the columnar structure according to the present embodiment employs, for the measurement, the thread constituting the string LS and the ruler (scale) for measuring the distance d between the string LS and the concrete pole CP. Therefore, according to the method of the present embodiment, a power source for the measurement is not required since electronic devices such as cameras and computers are not used. Moreover, according to the method of the present embodiment, since the measuring device is simplified, time required for learning a method of using the measuring device is reduced as compared with the conventional method. In other words, according to the method of the present embodiment, time and effort for work for measuring the deflection amount of the columnar structure and work for determining the performance of the columnar structure can be reduced.

Furthermore, the support member 10 can be used as it is as a base (e.g. pillow) on which the concrete pole CP is placed after the concrete pole CP is pulled out of the ground. The support member 10 can also be used as it is as a base (e.g. base for round objects) on which the concrete pole CP is stored after the concrete pole CP is removed from the field. In other words, according to the method of the present embodiment, the configuration of the measuring device is simplified. Thus, according to the method of the present embodiment, time and effort for work for measuring the deflection amount of the columnar structure and work for determining the performance of the columnar structure can be reduced.

In addition, as mentioned above, since the measuring jig 20 never naturally falls off the concrete pole CP while the measuring jig 20 is attached to the concrete pole CP, the measuring worker can perform the measuring operation by himself/herself. In this regard, some measuring methods cannot measure the deflection amount of the concrete pole CP unless there are two or more measuring workers. In comparison with these methods, according to the method of the present embodiment, time and effort for work for measuring the deflection amount of the columnar structure and work for determining the performance of the columnar structure can be reduced.

Next, modifications to the above-mentioned embodiment will be described with reference to FIGS. 6 to 9. First, a variation of the measuring jig 20 will be described with reference to FIGS. 6 and 7.

Figure 6:
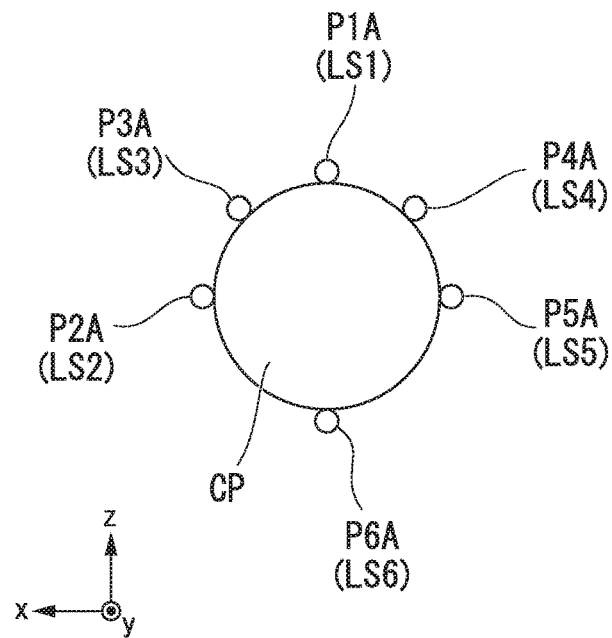
FIG. 6 is a schematic view representing an exemplary position of a string on the apex according to a measuring jig of a variation.

FIG. 6 is a schematic view representing an exemplary position of the string LS on the apex according to the measuring jig of the variation of the present embodiment. In other words, an exemplary position of the string LS in a cross section A of FIG. 4 is illustrated in FIG. 6.

Figure 7:
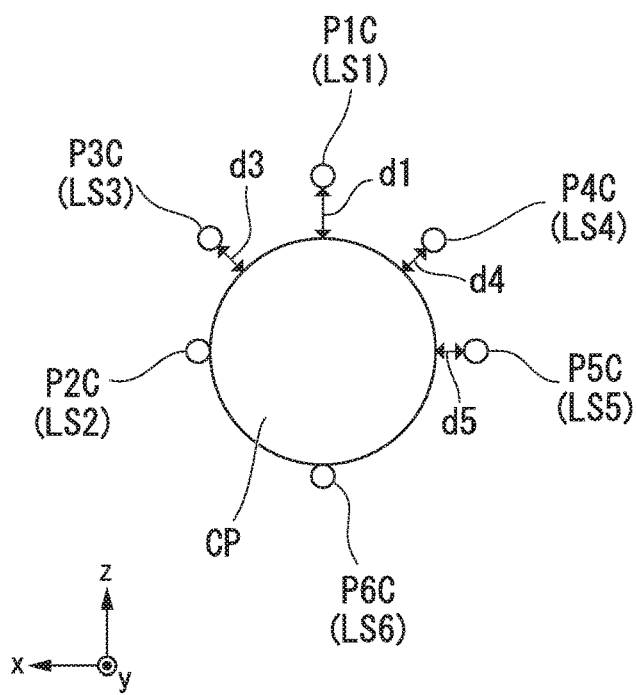
FIG. 7 is a schematic view representing an exemplary position of the string in the middle according to the measuring jig of the variation.

FIG. 7 is a schematic view representing an exemplary position of the string LS in the middle according to the measuring jig of the variation of the present embodiment. In other words, an exemplary position of the string LS in a cross section B of FIG. 4 is illustrated in FIG. 7.

The above-mentioned embodiment has described a case where the measuring jig 20 has a single string LS. The string LS is positioned at the point P1A illustrated in FIG. 6 on the apex AP. In the middle of the concrete pole CP, the string LS is positioned at the point P1C illustrated in FIG. 7.

In the present variation, the measuring jig 20 has a plurality of strings LS. Specifically, the measuring jig 20 has the strings LS1 to LS6. Among the strings LS1 to LS6, the string LS1 is positioned at the point P1A illustrated in FIG. 6 on the apex AP. In the middle of the concrete pole CP, the string LS1 is positioned at the point P1C illustrated in FIG. 7. In other words, the string LS1 corresponds to the string LS in the above-mentioned embodiment.

The string LS2 is positioned at a point P2A illustrated in FIG. 6 on the apex AP. In the middle of the concrete pole CP, the string LS2 is positioned at a point P2C illustrated in FIG. 7. The strings LS3 to LS6 are also respectively positioned at points P3A to P6A and points P3C to P6C in the same way as the strings LS1 and LS2. In the present variation, distances between the respective strings LS and the concrete pole CP are assumed to be distances d1 to d6, and these distances d1 to d6 are measured. In other words, according to a measuring method that uses the measuring jig 20 of the variation, the deflection direction of the concrete pole CP and the deflection amount in each deflection direction can be simultaneously measured.

Next, a variation of the method for measuring the deflection amount will be described with reference to FIGS. 8 and 9.

Figure 8:
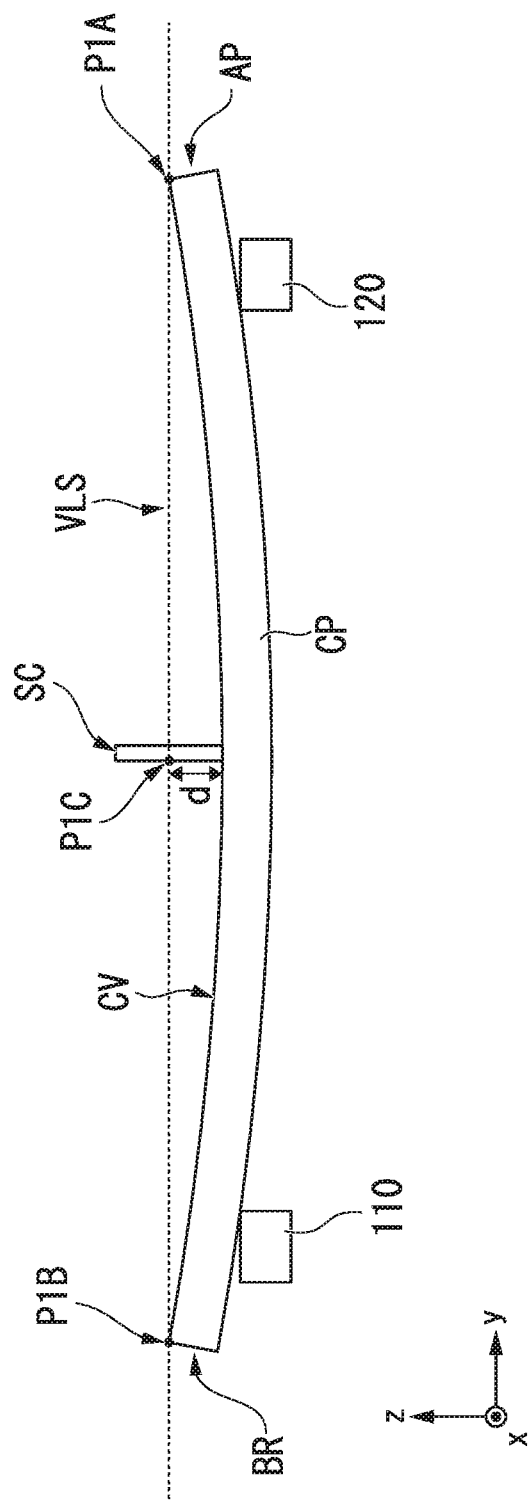
FIG. 8 is a schematic view representing a method for measuring a deflection amount according to a first variation of the present embodiment.

FIG. 8 is a schematic view representing a method for measuring the deflection amount according to a first variation of the present embodiment. In the above-mentioned embodiment, the string LS, namely the thread is stretched for the measurement.

In the present variation, as illustrated in FIG. 8, the deflection amount is measured by measuring a distance d between a virtual string VLS and the concrete pole CP without stretching the thread. The virtual string VLS as used herein is generated by seeing, in the y axis direction, the point HA on the apex AP through the point P1B on the bottom BR of the concrete pole CP. Specifically, a ruler (scale) is erected at the point P1C illustrated in FIG. 8 in the vertical direction so as to come into contact with the concrete pole CP, and the point PTA on the apex AP is seen through the point P1B on the bottom BR in the y axis direction. In this case, by reading a graduation of the ruler at a position where the virtual string VLS crosses the ruler, the deflection amount is measured. As a result, the deflection amount can be measured using a measuring device simpler than that of the above-mentioned embodiment.

Figure 9:
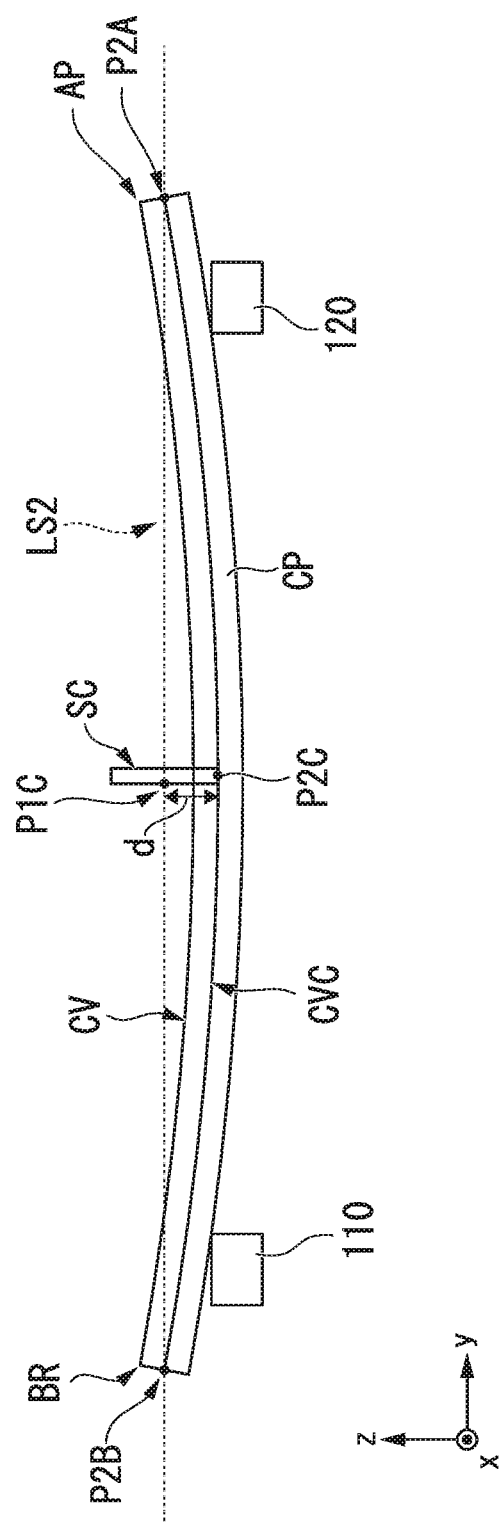
FIG. 9 is a schematic view representing a method for measuring a deflection amount according to a second variation of the present embodiment.

FIG. 9 is a schematic view representing a method for measuring the deflection amount according to a second variation of the present embodiment. In the above-mentioned embodiment, the string LS is stretched between the point HA at the vertical upper edge of the apex AP and the point P1B at the vertical upper edge of the bottom BR to measure the deflection amount.

In the present variation, as illustrated in FIG. 9, the string LS is stretched between a position other than the point P1A on the apex AP and a position other than the point P1B on the bottom BR to measure the deflection amount. For example, in the present variation, the string LS2 is stretched between the point P2A on the apex AP and a point P2B on the bottom BR to measure the deflection amount. Such a configuration can also enable the measurement of the deflection amount through the use of the simple measuring device.

In addition, by preparing a jig that supports an object to be measured such that the object can rotate under its own weight, the deflection amount of not only a cylindrical structure but also a square columnar structure can be measured in the same way as mentioned above.

The apparatus, systems and methods in the above-described embodiments may be deployed in part or in whole through machines, a system of circuits, circuitry, hardware processors that executes computer software, software components, program codes, and/or instructions on one or more machines, a system of circuits, circuitry, hardware processors. In some cases, the one or more machines, a system of circuits, circuitry, hardware processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more hardware processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more hardware processors may enable execution of multiple programs, threads, and codes. The threads may be executed simultaneously to enhance the performance of the one or more hardware processors and to facilitate simultaneous operations of the application. Program codes, program instructions and the like described herein may be implemented in one or more threads. The one or more hardware processors may include memory that stores codes, instructions and programs as described herein. The machines, a system of circuits, circuitry, hardware processors may access a non-transitory processor-readable storage medium through an interface that may store codes, instructions and programs as described herein and elsewhere. The non-transitory processor-readable storage medium associated with the machines, a system of circuits, circuitry, hardware processors for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods, apparatus and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods, apparatus and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

As used herein, the following directional terms "front, back, above, downward, right, left, vertical, horizontal, below, transverse, row and column" as well as any other similar directional terms refer to those instructions of a device equipped with embodiments of the present invention. Accordingly, these terms, as utilized to describe embodiments of the present invention should be interpreted relative to a device equipped with embodiments of the present invention.

Each element for the system, device and apparatus described above can be implemented by hardware with or without software. In some cases, the system, device and apparatus may be implemented by one or more hardware processors and one or more software components wherein the one or more software components are to be executed by the one or more hardware processors to implement each element for the system, device and apparatus. In some other cases, the system, device and apparatus may be implemented by a system of circuits or circuitry configured to perform each operation of each element for the system, device and apparatus.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A method for measuring a deflection amount of a columnar structure, comprising:
    placing a longitudinal direction of a columnar structure in a direction parallel to a ground to place the columnar structure on a rolling surface of a support member, the rolling surface being parallel to the ground and configured to support the columnar structure such that the columnar structure is rotatable around an axis in the longitudinal direction;
    waiting for a relative position between a position on the rolling surface where the columnar structure has been placed and a position of the columnar structure to change when the columnar structure placed on the rolling surface rotates under its own weight of the columnar structure around the axis of the columnar structure;
    determining that the columnar structure has stopped rotating under its own weight around the axis; and
    measuring, after the stop of the rotation is determined, a distance in a vertical direction between a straight line connecting both ends in the longitudinal direction of the columnar structure and a curved line along a shape in the longitudinal direction of the columnar structure.

2. The method according to claim 1, wherein
the support member is greater in hardness than the columnar structure.

3. The method according to claim 1, wherein
the straight line is defined to be a straight line connecting a vertical upper edge of one end of the both ends to a vertical upper edge of the other end, and
the curved line is defined to be a curved line along a shape in the longitudinal direction of the columnar structure from the vertical upper edge of the one end to the vertical upper edge of the other end.

4. A method for determining performance of a columnar structure, comprising:
    comparing a deflection amount of a comparative columnar structure measured in advance with a deflection amount of a measured columnar structure measured by a method for measuring a deflection amount of a columnar structure; and
    determining performance of the measured columnar structure,
    wherein the method comprises:
    placing a longitudinal direction of each of the comparative columnar structure and the measured columnar structure in a direction parallel to a ground to place each of the comparative columnar structure and the measured columnar structure on a rolling surface of a support member, the rolling surface being parallel to the ground and configured to support each of the comparative columnar structure and the measured columnar structure such that each of the comparative columnar structure and the measured columnar structure is rotatable around an axis in the longitudinal direction;
    waiting for a relative position between a position on the rolling surface where each of the comparative columnar structure and the measured columnar structure has been placed and a position of each of the comparative columnar structure and the measured columnar structure to change when each of the comparative columnar structure and the measured columnar structure placed on the rolling surface rotates under its own weight of each of the comparative columnar structure and the measured columnar structure around the axis of each of the comparative columnar structure and the measured columnar structure;
    determining that each of the comparative columnar structure and the measured columnar structure has stopped rotating under its own weight around the axis; and
    measuring, after the stop of the rotation is determined, a distance in a vertical direction between a straight line connecting both ends in the longitudinal direction of each of the comparative columnar structure and the measured columnar structure and a curved line along a shape in the longitudinal direction of each of the comparative columnar structure and the measured columnar structure.

\* \* \* \* \*